United States Patent

Baitz et al.

[11] Patent Number: 5,488,202
[45] Date of Patent: Jan. 30, 1996

[54] WEIGHING DEVICE FOR THE REGISTRATION OF GOODS IN STORES

[75] Inventors: Günter Baitz; Rainer Ihlenburg, both of Berlin, Germany

[73] Assignee: Siemens Nixdorf Informationssysteme Aktiengesellschaft, Paderborn, Germany

[21] Appl. No.: 74,843

[22] PCT Filed: Dec. 10, 1991

[86] PCT No.: PCT/EP91/02368

§ 371 Date: Jun. 9, 1993

§ 102(e) Date: Jun. 9, 1993

[87] PCT Pub. No.: WO92/10122

PCT Pub. Date: Jun. 25, 1992

[30] Foreign Application Priority Data

Dec. 10, 1990 [DE] Germany .......................... 40 39 377.1

[51] Int. Cl.⁶ ................................................. G01G 19/40
[52] U.S. Cl. .......................................... 177/25.15; 177/50
[58] Field of Search ................................ 177/25, 15, 50; 186/61

[56] References Cited

U.S. PATENT DOCUMENTS

| | | | |
|---|---|---|---|
| 3,836,755 | 9/1974 | Ehrat | 186/61 X |
| 3,840,092 | 10/1974 | Close | 186/1 |
| 3,990,540 | 11/1976 | Aleshire et al. | 186/1 |
| 4,779,706 | 10/1988 | Mergenthaler | 186/61 |
| 4,787,467 | 11/1988 | Johnson | 177/50 |
| 4,909,356 | 3/1990 | Rimondi et al. | 177/50 X |
| 5,020,750 | 6/1991 | Vrooman et al. | 248/97 |
| 5,083,638 | 1/1992 | Scheider | 177/25.15 X |

FOREIGN PATENT DOCUMENTS

| | | |
|---|---|---|
| 0178223 | 4/1986 | European Pat. Off. . |
| 0327514 | 8/1989 | European Pat. Off. . |
| 0401950 | 12/1990 | European Pat. Off. . |
| 2536977 | 6/1984 | France . |
| 1927819 | 2/1971 | Germany . |
| 2214763 | 9/1973 | Germany . |
| 7501285 | 10/1975 | Germany . |
| 3107761 | 9/1982 | Germany . |

*Primary Examiner*—Peter S. Wong
*Assistant Examiner*—Randy W. Gibson
*Attorney, Agent, or Firm*—Hill, Steadman & Simpson

[57] ABSTRACT

A weighing device for the self-service registration of goods in stores contains a floor scale (2), which is disposed in an upwardly open standing container (3). The floor scale (2) has a suspension device (8) for at least one carrying container (11) which is removable from it. It is protected by the standing container (3) against accidental influences from outside, so that prolongations of the weighing procedure are prevented. As a result of the arrangement of the carrying container (11) on the floor balance (3), the departure of the customer with the weighed goods from the weighing area is speeded up. As the weighing receptacle in the standing container (3), a shopping container, for example a shopping cart (21), can also be used. For this purpose, the floor scale (50, 60) is in this case of U-shaped configuration in top view and is provided with bearing elements (52, 71) for the shopping container.

14 Claims, 6 Drawing Sheets

WEIGHING DEVICE FOR THE REGISTRATION OF GOODS IN STORES

BACKGROUND OF THE INVENTION

1. Field of the Invention

The invention relates to a weighing device for the registration of goods in stores, in which each purchased article is identified, subsequently weighed for weight-registration purposes in a weighing receptacle and then taken up, where appropriate, by a carrying container.

2. Description of the Related Art

It is already known to register goods purchased in department stores at self-service goods-registration points and to draw up automatic statements. For this purpose, the customer brings the goods which he/she has purchased, generally in a shopping cart, to a goods-registration point and guides them through a scanning procedure by which bar-coded labels attached to the goods are scanned. Afterwards, the goods are placed into a depositing container, which can also be a further shopping cart and is coupled to a balance. In identifying the goods by the scanning of their labels, the price and weight of the goods are determined. The price of the goods is reported to a till system, the weight information is fed to a comparison device. When the goods are then subsequently weighed, their weight can be compared to the weight information obtained in the identification procedure. If the comparison values agree, then a faulty evaluation or attempted deception can be ruled out.

In the case of this self-service registration of goods, inaccuracies and delays can occur. The balances normally have a weighing accuracy of just a few grams. In the weighing procedure, the time it takes for the balance to settle is often substantially prolonged by different types of external influences, for example accidental nudging, drafts etc.. Moreover, the depositing of the goods, following weighing, in a depositing container belonging to the goods-registration device entails a time loss, since the goods can only thereafter be packed.

It is also already known, instead of a depositing container, to provide carrier bags directly alongside the goods-registration device. However, these have to be taken by the customer from a special storage bay and placed onto the balance. The registered goods can then be filled directly into such a carrier bag. In this case however, the carrier bag has first to be unfolded and erected, thereby substantially prolonging the time spent, particularly where a plurality of carrier bags is used.

SUMMARY OF THE INVENTION

The object of the invention is to define a weighing device for the registration of goods which is insensitive to external influences and avoids delays of the above-described type following weighing, so that the customer is able to leave the goods-registration area directly after the weighing.

This object is achieved by the invention which is a weighing device for the registration of goods in stores, in which each purchased article is identified, subsequently weighed for weight-registration purposes by a floor scale and then taken up, where appropriate, by a carrying container, the floor scale being connected to a support which projects approximately to the waist level and which, close to its upper end, is provided with a suspension device for at least one carrying container which is removable from it.

The weighing receptacle of the weighing device, in one embodiment, is a receiving container filling the interior of a standing container and yet free of the standing container to allow weighing movement therebetween, the suspension device being fitted to the wall of the receiving container. In another embodiment, the weighing receptacle is a shopping container which can be pushed into the interior of the standing container and onto the floor scale, above which shopping container the suspension device is disposed.

The suspension device has at least one cantilever bar from which the carrying container, which is a carrier bag, hangs. Preferably, the suspension device supports a carrier bag pack comprising a plurality of carrier bags connected to one another at predetermined breaking points. In an exemplary embodiment, the suspension device has two bars, from which the carrier bags hang by their carrying handles, and the carrier bags are connected to one another via webs made from the bag material which are formed onto the sides of the bags and which form the predetermined breaking points.

The floor scale of another embodiment is a unit disposed centrally on the base of the standing container having a hood-shaped bearing plate covering it for supporting a shopping cart, the wheels of which can be pushed onto both sides of the floor scale on the bearing plate.

The floor scale may be U-shaped in top view and have, between the U-legs, a bearing device for the shopping container. The bearing device is configured as a bearing plate mounted pivotably about a line connecting the U-legs. In addition, a latch device for holding the shopping container in a weighing position is provided, which latch device can preferably be released electromagnetically. The bearing plate is preferably connected to the movable scale top part and lies, in the resting state of the floor scale, on the latter's stand-on surface, and a lifting mechanism for raising the bearing plate and the scale top part into a weighing position is provided.

Alternately, the bearing device has bearing journals fitted to the scale top part, and a lifting mechanism for raising the bearing journals and the scale top part into a weighing position. A switch is provided for the latch device, which switch is actuated by a shopping container being inserted into the standing container to switch on an electric motor as the drive for the lifting mechanism.

Since, in the case of a weighing device according to the invention, a standing container is provided in which there is disposed a floor balance or scale, the latter is effectively protected against external influences such as, for example, accidental contacts or drafts. The standing container can be constructed such that it shields from the environment virtually all parts which are moved in connection with the weighing. Any prolongation of the weighing procedure resulting from external influences is thereby eliminated. Since the floor balance is further provided with a suspension device for one or more carrying containers which are thus located, like the floor balance itself, in the standing container, the goods to be weighed can be brought easily into the standing container and, following weighing, repacked within the standing container into the carrying container. The latter is then simply removed from the standing container and the customer is able to move immediately away from the weighing device.

BRIEF DESCRIPTION OF THE DRAWINGS

Illustrative embodiments of the invention and its component parts are explained in greater detail below with reference to the drawing, in which.

DETAILED DESCRIPTION OF THE PREFERRED EMBODIMENTS

Figure 1:
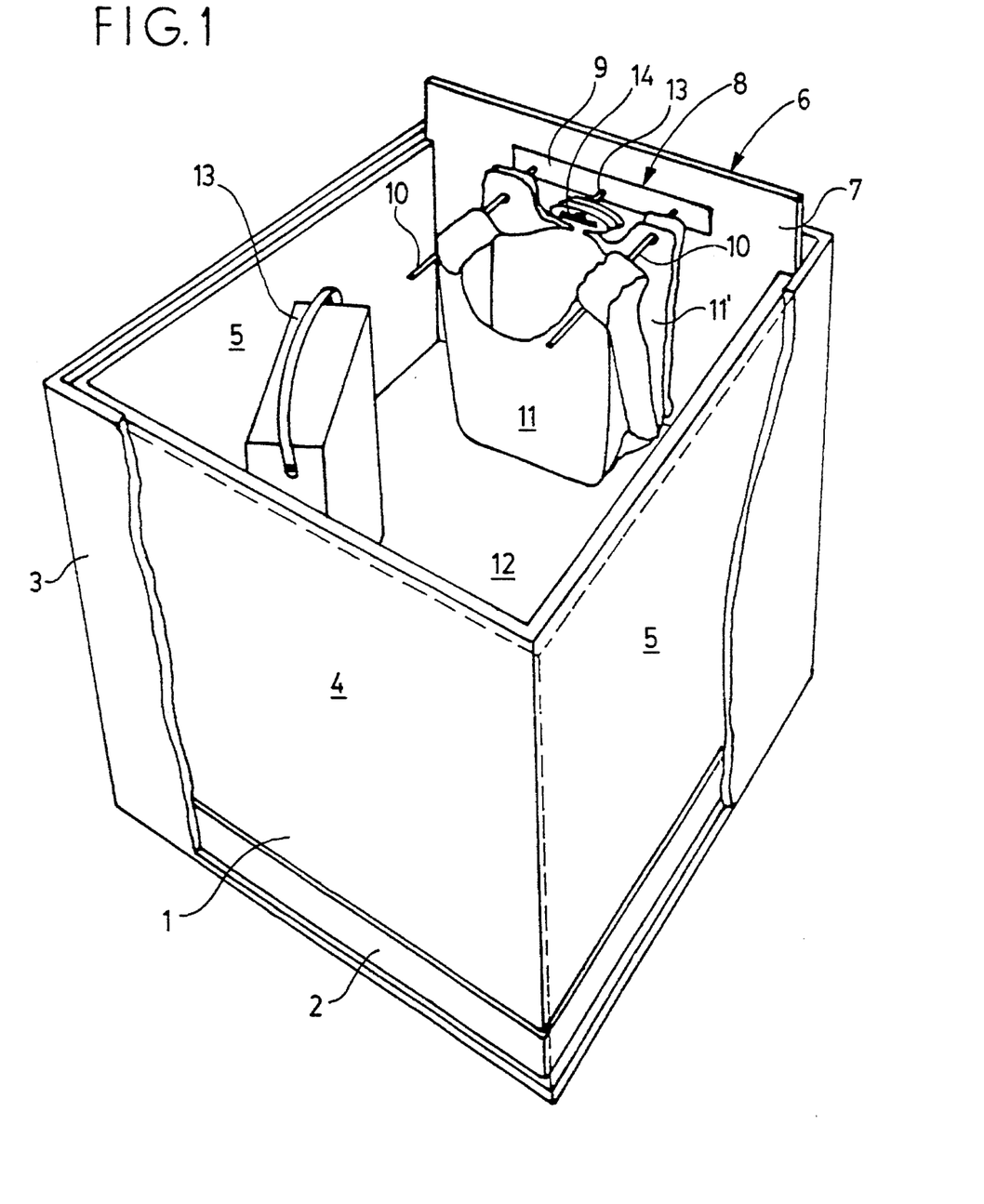
FIG. 1 shows a perspective representation of a weighing device as a first illustrative embodiment.

FIG. 1 shows an upwardly open container 1 as a weighing receptacle, which is fastened on a floor balance 2. The arrangement 1, 2 is surrounded by a box 3 as a standing container such that the walls 4, 5, 6 of the container 1 just make no contact with the box, so that the balance enjoys free play for the weighing procedure. The side walls of the box 3 are slightly higher than the side walls 4, 5 of the container 1, so that a customer, if resting upon the top edge of the box 3, does not impede the free play of the container-balance-combination 1, 2.

The rear wall 6 of the container 1 is higher than the box 3. To that part 7 of the rear wall 6 which extends beyond the box 3, there is attached a carrier bag holder 8. This essentially comprises a baseplate 9, from which two bars 10 perpendicularly protrude, so that they project horizontally into the clear interior of the container 1. From the bars 10 a pack of carrier bags 11 is suspended in such a way that the foremost bag is always open. Carrier bags 11 and carrier bag holders 8 are described in greater detail later.

The weighing procedure now proceeds as follows: the customer takes his/her goods in optional sequence out of his/her shopping cart and guides them, for registration purposes, over a scanner (known per se and hence not represented) which might be disposed, for example, on the right alongside the box 3. He/she then deposits the registered goods, according to size, in the carrier bag 11 or on the base 12 of the container 1, as shown for a large-size bundle 13. If the ready-held carrier bag 11 is full, it is pulled from the bars 10 and likewise deposited on the container base 12. The next carrier bag 11' hereupon automatically opens. Following completion of the goods-registration procedure, the customer takes the purchased goods out of the container 1.

This is effected very speedily since the container is disposed in the box protected from any drafts and accidental contact, so that the balance 2 settles very quickly after an article has been deposited in the container 1. Added to this is the fact that the entire shopping load is registered on a single receipt, thereby eliminating any assignment problems between goods and receipts. Finally, as a result of the quasi automatic provision of reception-ready carrier bags, no significant delays occur when the goods are packed.

Figure 2:
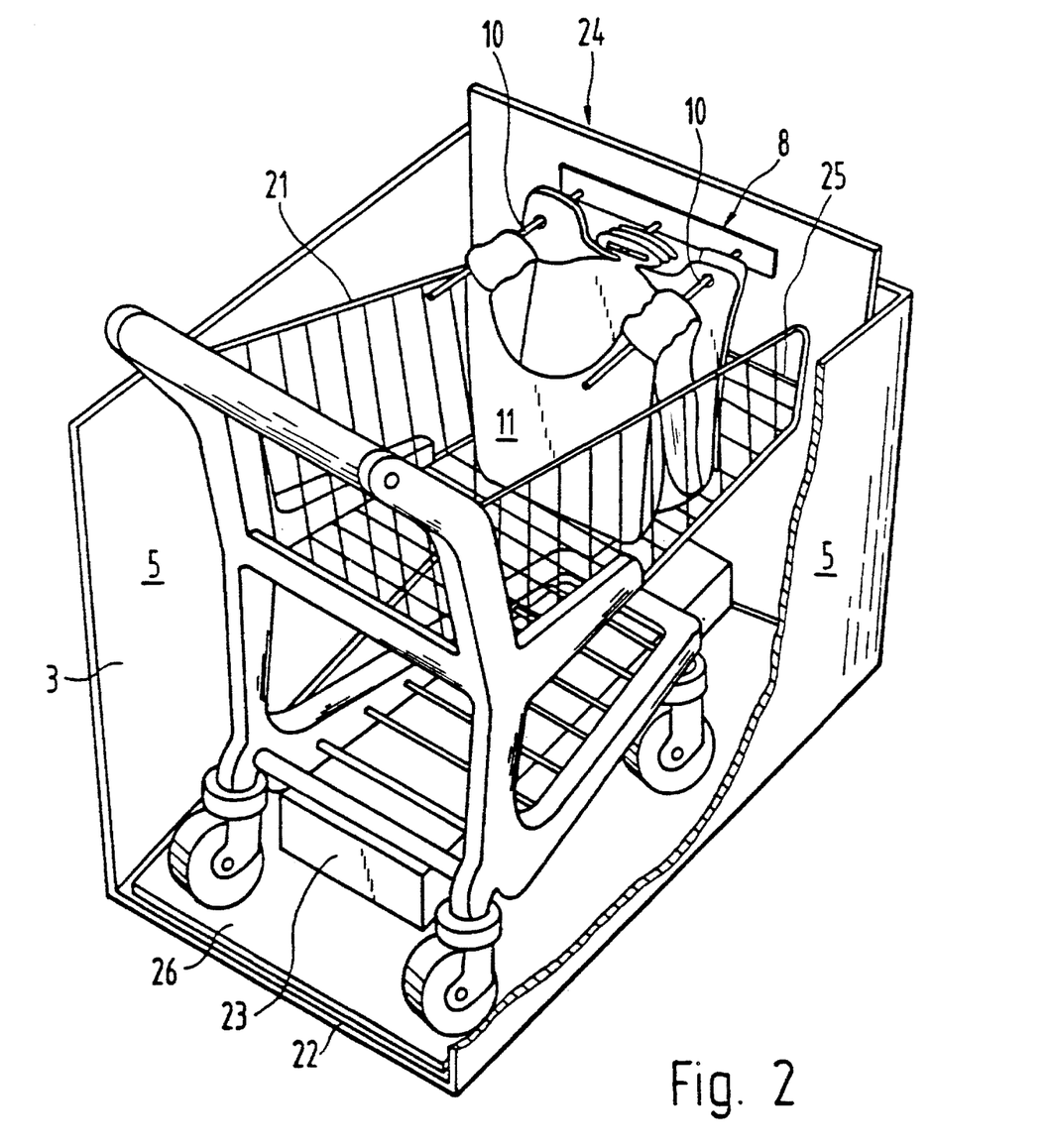
FIG. 2 shows a perspective representation of a weighing device as a second illustrative embodiment.

In FIG. 2, a second illustrative embodiment of the weighing device is represented. The same parts bear the same reference symbols. Once again, a box 3 is provided. As the weighing receptacle, a shopping cart 21 can be pushed into the box 3. For this purpose, the front wall of the box 3 is missing. It could also be constructed as a door. On the base 22 of the box 3 there is disposed a balance 23, which registers the weight of the shopping wagon 21 and of the already scanned goods located in it. The balance is covered by a hood-shaped bearing plate 26, which essentially occupies the entire base 22 of the box 3. This arrangement of the balance 23 is favourable for technical weight-measuring reasons. The shopping cart 21 is pushed onto the bearing plate 26 having its wheels on both sides of the balance 23.

To the weighing part of the balance 23, there is connected a rear wall 24. The above-described carrier bag holder 8 is attached to this wall in such a way that at least the opened carrier bag 11 is located above the receiving space of the shopping cart 21. In order, when the shopping cart 21 is pushed into the box 3, to enable the carrier bags 11 to slide into the receiving space, the front wall 25 of the shopping cart 21 is of very low construction. It is also however conceivable for a higher front wall, during the push-in procedure, to be pivoted downwards, for example, by dogs located in the box 3 and to be swivelled back up again when the cart 21 is transported out of the box 3.

The carrier bag holder 8 and carrier bags 11 are described with reference to FIGS. 1, 3 and 4. Carrier bags having grip openings for suspension in bundles on a rod are known from German Patent Model 73 41 794. These bags have handles, extending upwards from the side walls, exhibiting grip openings. The latter serve, at the same time, for the suspension of the bags on a rod. The handle pointing towards the free rod end is in each case folded downwards. If the foremost bag is grasped by this handle and pulled from the rod, then the bag opens. In this arrangement, although the mutually clinging side walls are parted, the bag still has to be held with the hands for filling, otherwise it collapses. The known arrangement is not therefore suitable for use in connection with the self-service registration of goods. Even if the known bag were to remain hanging by a handle from the rod so that the customer were to keep his/her hands free, the fill-opening would close up again due to the weight of the goods already located in the bag. Apart from this, the one carrying handle can easily tear apart.

Figure 3:
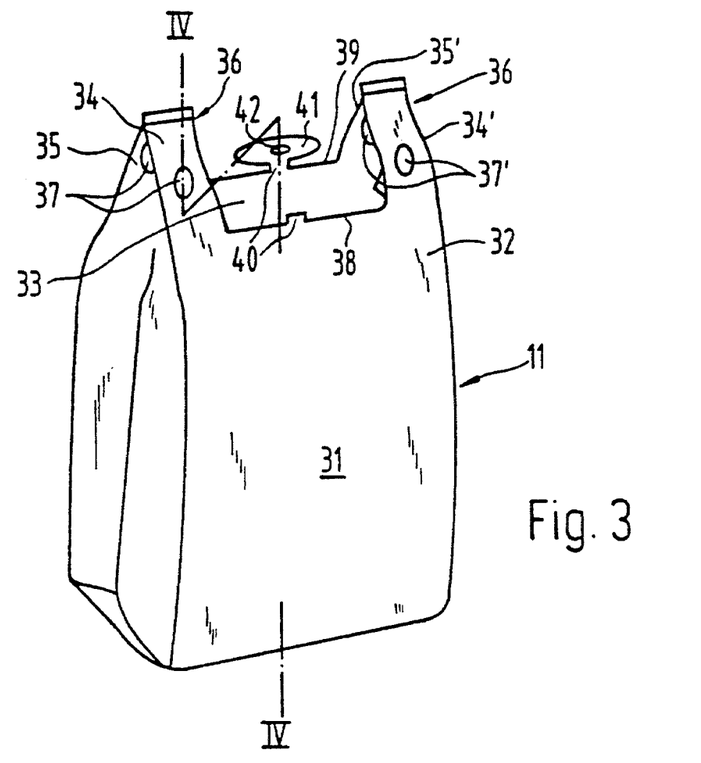
FIG. 3 shows a perspective representation of a carrying container.
Figure 4:
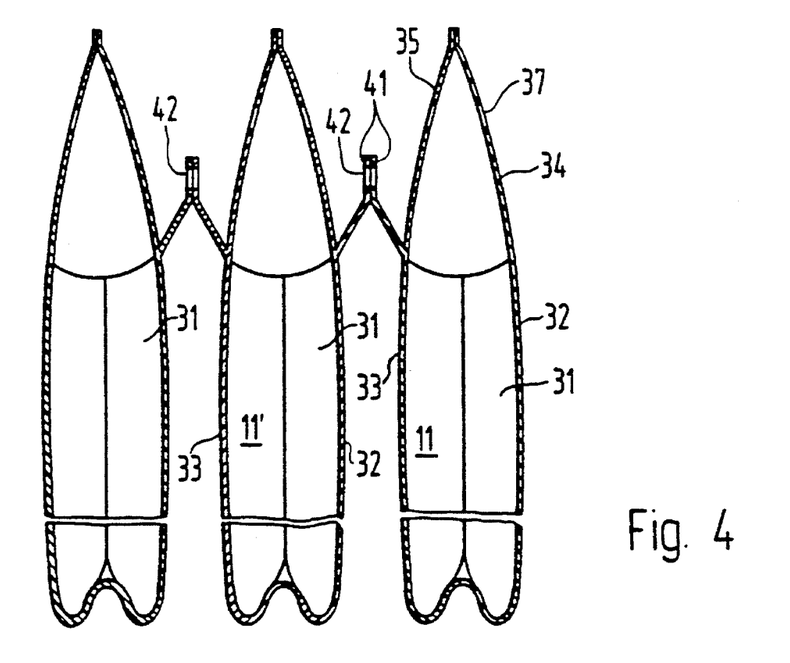
FIG. 4 shows a sectional representation of a plurality of continuous carrying containers.

In FIGS. 3 and 4, the carrier bags 11 are represented slightly inflated in order to make their shape more easily recognisable. Above the sack 31, formed onto the front and rear walls 32, 33, there are tabs 34, 35 or 34', 35', which are respectively bonded together at their top edge and hence form carrying handles 36. The tabs 34, 35 or 34', 35' of all bags have mutually aligned holes 37 or 37'.

In the middle between the carrying handles 36, a connecting tab 41 is formed in each case, by means of a narrow web 40, onto the upper edges 38, 39 of the front and rear walls 32, 33. FIG. 4 shows that the connecting tab, located on the rear wall 33, of a bag 11 is bonded in each case to the connecting tab on the front wall 32 of the neighbouring bag 11'. The connecting tabs of all bags have mutually aligned holes 42.

As already described with reference to FIG. 1, the carrier bag holder 8 has two parallel bars 10. Standing between these is a journal 13. At the front end of the journal 13, a bolt 14 is disposed rotatably between a position parallel to the journal 13 and a position offset by 90°. In the latter position, the bolt forms with the journal 13 a "T", as shown in FIG. 1. The bars 10 and the journal 13 are disposed according to the holes 37, 37', 42 of the carrier bags 11.

In order to load the carrier bag holder 8 with a carrier bag pack, the bolt 14 is brought into its position parallel to the journal 13. The carrier bag pack is now mounted by its holes onto the bars 10 and onto the journal 13 and the bolt 14 is twisted into its locking position. The first carrier bag 11 of the pack is opened, its front wall 32 being pulled in the direction of the free end of the bars 10. The sack 31 hereupon opens and remains in its opened position, because the tabs 34, 35 or 34', 35' move apart and rest at a distance apart on the bars 10. Following filling, the carrier bag 11 is pulled from the bars 10. Upon this, the hole 42 initially tears apart, so that the removal of the bag 11 is not impeded by the bolt 14. The webs 40 still however connect the front wall 32 of the next carrier bag 11' to the rear wall of the pulled-off carrier bag 11, so that the next carrier bag 11' is opened as the bags draw further apart. Only after this does the web 40 tear and the carrier bag 11 can be fully removed. In this way, the customer always has an opened carrier bag available without any other manipulations being necessary.

Figure 5:
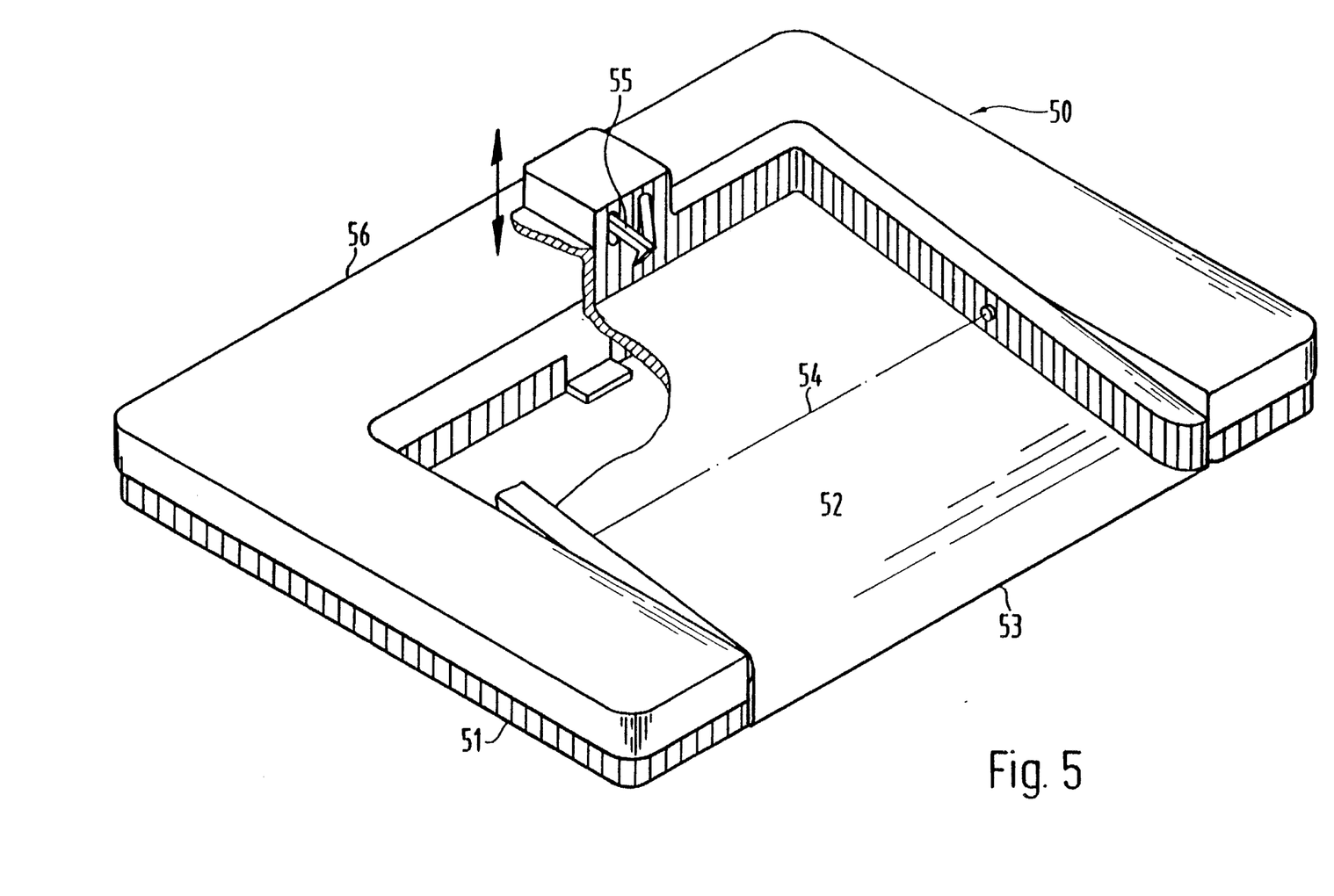
FIG. 5 shows a perspective representation of a floor balance.

For a balance which is suitable for use in an arrangement according to FIG. 2, a plurality of embodiments is conceivable. FIG. 5 shows a balance 50 in which the weight-measuring devices are disposed in a U-shaped housing 56. The foot 51 of the balance rests on the floor or the base of the standing container. The interspace between the U-legs is occupied by a bearing plate 52 for the shopping cart. This bearing plate is pivotable about a line 54 lying parallel to its front edge 53, which front edge serves, at the same time, as a drive-up ramp for the shopping cart.

For weighing, the shopping cart is pushed from the open U-side onto the bearing plate 52. The lateral U-legs serve in this case to guide the cart into the correct position. If the cart is pushed fully onto the bearing plate 52, the latter, due to the center of gravity of the cart, tilts about the axis 54 in such a way that it comes free from the base. An unimpeded weighing is thereby possible. The cart is held fast in the weighing position by a latch hook 55 which engages behind its undercarriage and which is released, preferably by an electromagnet, only after the registration is completed, which electromagnet can be controlled from the scanner by the completion of the registration procedure.

Figure 6:
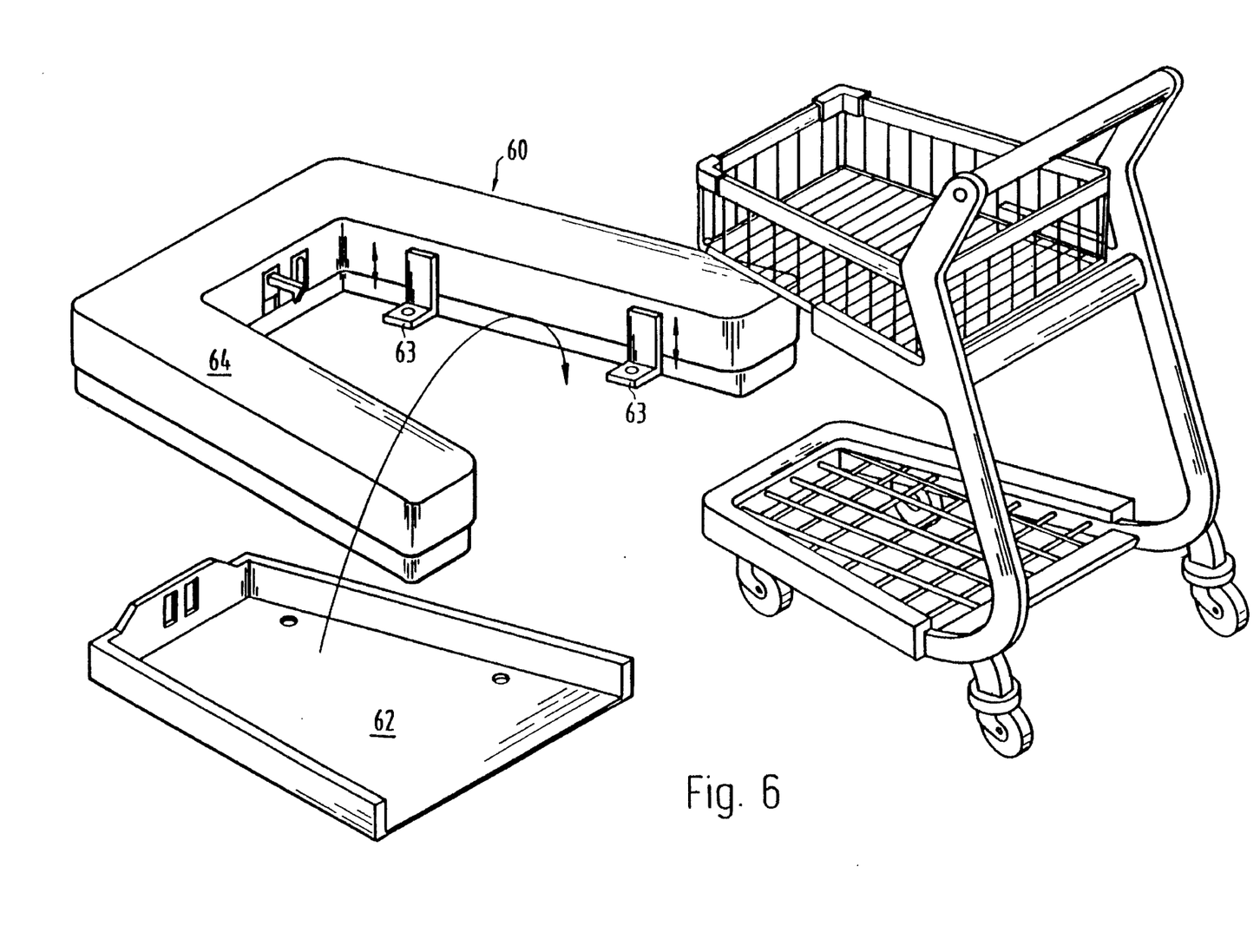
FIG. 6 shows a perspective representation of a further floor balance with a shopping wagon as the weighing receptacle.

FIG. 6 shows an arrangement similar to FIG. 5, the bearing plate 62 of the floor balance 60 being firmly connected, however, via angle brackets 63 to the top part 64. In order to facilitate driving-in, the bearing plate 62 rests on the floor or on the base of the standing container. For weighing, the balance top part 64, together with the bearing plate 62, is raised up by motor power so that it comes free from the base. The lifting mechanism is described in greater detail with reference to FIG. 7.

Figure 7:
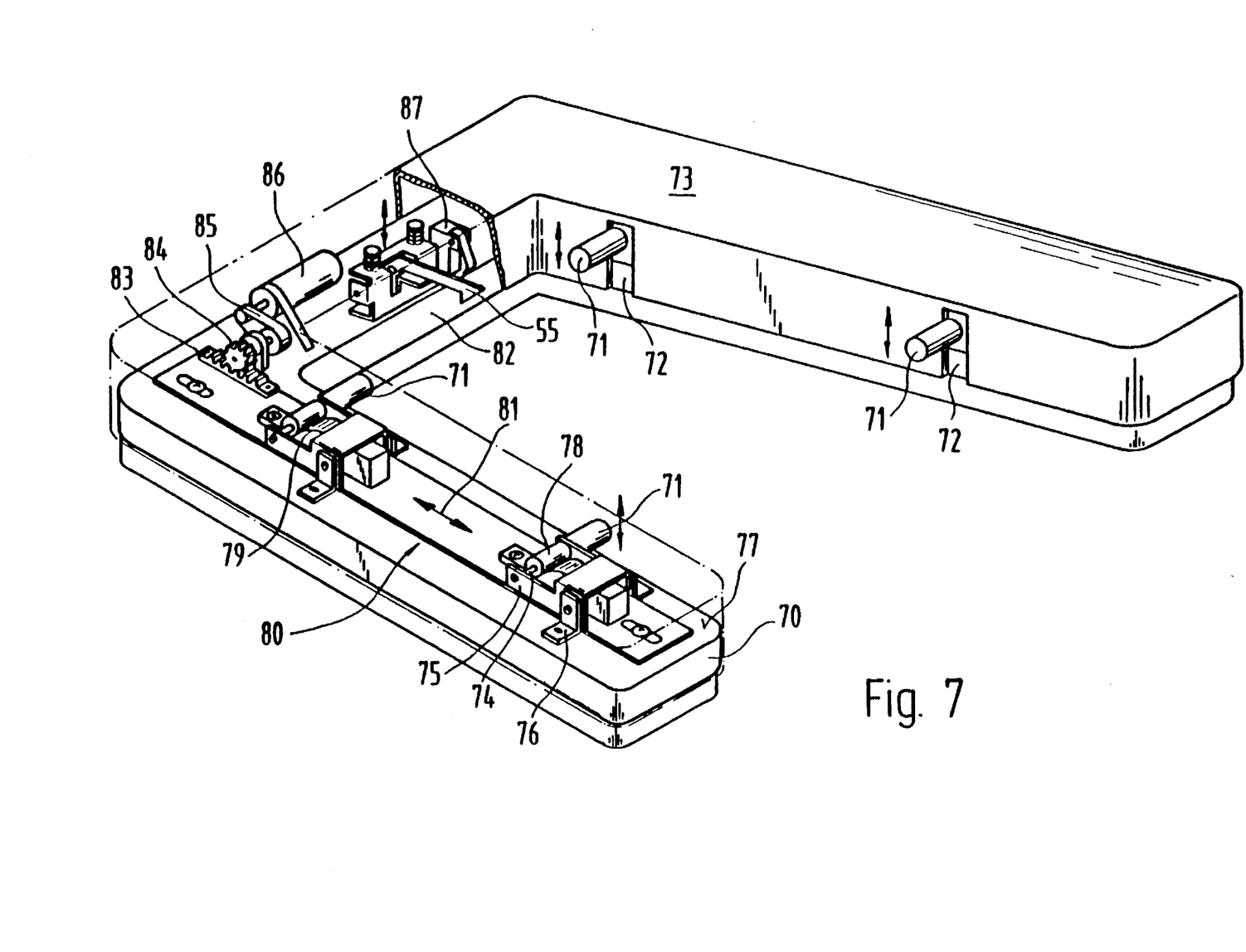
FIG. 7 shows a perspective representation of a further floor balance.

FIG. 7 shows, in partly fragmented representation, a further illustrative embodiment of a balance. Instead of a bearing plate, vertically adjustable journals 71 are fitted to the top part 70 of the balance, which journals engages under the undercarriage of the shopping cart and raise it up from the base prior to weighing. The journals 71 project through slots 72 in a cover 73, which is uninvolved in the weighing procedure. This has the advantage that any inadvertent contact with the foot has no influence upon the weighing.

In the direction of the cart interior, each journal 71 is formed out to form a shaft 74, which is mounted in a U-shaped bracket 75. The bracket 75 is mounted pivotably, by its end remote from the shaft 74, about an axis 76, on the top side 77 of the top part 70. A roller 78, which rolls along on a ramp 79, is rotatable on the shaft 74. The ramps of in each case one cart side are configured on a slide 80, which is mounted displaceably on the top side 77 in the direction of the arrow 81. To that end of the slide 80 near to the U-middle-section 82 of the balance, there is fitted a toothed rack 83 which mates with the pinion 84 of a variable drive system. The latter is an electric motor 86, to which a reducing gear system 85 is after-connected.

If a shopping cart is pushed into the interspace between the U-legs of the balance, it is trapped in its end position by a latch hook 55. The cart hereupon actuates with its front bumper a switch 87, by means of which the motor 86 is actuated in the direction of the raising of the journals 71. The slide 80 is moved to the left, as a result of which the rollers 78 slide up on the ramps 79. The journals 71 are thereby raised. They hereupon under-grip the undercarriage of the shopping cart and raise this up from the base. The above-described arrangement is also usable on a balance according to FIG. 2.

Although other modifications and changes may be suggested by those skilled in the art, it is the intention of the inventors to embody within the patent warranted hereon all changes and modifications as reasonably and properly come within the scope of their contribution to the art.

We claim:

1. A weighing device for registering goods in stores, in which each purchased article is identified and then weighed for weight-registration purposes, comprising:

a floor scale operable to weigh articles placed on a weighing portion,     a support mounted on said weighing portion of said floor scale and projecting upwardly approximately to waist level,     a suspension means mounted on said support close to an upper end of said support for suspending at least one carrying container which is removable from said suspension means,     a standing container having upwardly extending walls, said standing container extending at least partly about said floor scale and being free of said weighing portion of said floor scale,     a weighing receptacle resting on said weighing portion and including a receiving container in an interior of said standing container and being free of said standing container to permit weighing movement between said weighing receptacle and said standing container, said weighing receptacle being a shopping container which can be pushed into said interior of said standing container and onto said weighing portion of said floor scale, said suspension means being disposed above said shopping container.

2. A weighing device as claimed in claim 1, wherein said suspension means includes at least one cantilever bar, said at least one carrying container including a carrier bag hanging from said at least one cantilever bar.

3. A weighing device as claimed in claim 2, wherein said at least one carrying container includes a carrier bag pack having a plurality of carrier bags connected to one another at predetermined breaking points and suspended from said suspension means.

4. A weighing device as claimed in claim 2, wherein said suspension means includes two bars from which said plurality of carrier bags hang by carrying handles, and said plurality of carrier bags are connected to one another via webs made from bag material which are formed onto bag sides and which form the predetermined breaking points.

5. A weighing device as claimed in claim 1, wherein said floor scale comprises a unit disposed centrally on a base of said standing container, a hood-shaped bearing plate covering said base and shaped for supporting a shopping cart having wheels so that when said shopping cart is pushed onto said bearing plate said wheels are on both sides of said floor balance.

6. A weighing device as claimed in claim 1, wherein said floor scale is U-shaped in top view having a pair of U-legs, and further comprising: a bearing device disposed between said U-legs for supporting the shopping container.

7. A weighing device as claimed in claim 6, wherein said bearing device includes a bearing plate mounted pivotably to said U-legs about a line connecting said U-legs.

8. A weighing device as claimed in claim 5, further comprising: a latch device holding the shopping container in a weighing position.

9. A weighing device as claimed in claim 6, further comprising: bearing plate connected to a movable top part of said floor scale, and a lifting mechanism for raising said bearing plate from a position resting on a surface into a weighing position above the surface.

10. A weighing device as claimed in claim 6, further comprising: bearing journals in said bearing device movable into a position to engage the shopping container, a lifting means for raising said bearing journals into a weighing position in engagement with the shopping container.

11. A weighing device as claimed in claim 8, further comprising: a switch connected to the latch device said switch being actuated by the shopping container inserted into said standing container, and an electric motor connected to drive said lifting mechanism in response to the shopping container being inserted into said standing container.

12. A weighing device as claimed in claim 8, wherein said latch device is electro-magnetically releasable from said shopping container.

13. A weighing device for registering goods in stores, in which each purchased article is identified and then weighed for weight-registration purposes, comprising:

a floor scale having a top weighing surface and operable to weigh articles placed thereon, a support mounted on said top weighing surface of said floor scale and projecting upwardly approximately to waist level of a person using the weighing device, a shopping cart which can be pushed onto said top weighing surface of said floor scale for weighing said shopping cart and its contents using said floor scale, a bag suspending means mounted on said support close to an upper end of said support for suspending a bag into which articles are placed from said shopping cart, said support and said bag suspending means being in weighing relation with said top weighing surface so that the bag and its contents are weighed by said floor scale, the bag being removable from said bag suspending means.

14. A weighing device as claimed in claim 13, further comprising:

a standing container mounted about said floor scale and free of said top weighing surface to shield against accidental contact and drafts during weighing of the shopping cart and any articles therein.

\* \* \* \* \*